(12) United States Patent
Michligk

(10) Patent No.: US 9,297,673 B2
(45) Date of Patent: Mar. 29, 2016

(54) TURBOMACHINE COMPONENT AND TURBOMACHINE EQUIPPED THEREWITH

(75) Inventor: Thomas Michligk, Oranienburg (DE)

(73) Assignee: MAN Diesel & Turbo SE, Augsburg (DE)

( * ) Notice: Subject to any disclaimer, the term of this patent is extended or adjusted under 35 U.S.C. 154(b) by 1142 days.

(21) Appl. No.: 13/264,798

(22) PCT Filed: Dec. 10, 2009

(86) PCT No.: PCT/DE2009/050071
§ 371 (c)(1),
(2), (4) Date: Feb. 1, 2012

(87) PCT Pub. No.: WO2010/118715
PCT Pub. Date: Oct. 21, 2010

(65) Prior Publication Data
US 2012/0121383 A1   May 17, 2012

(30) Foreign Application Priority Data
Apr. 17, 2009   (DE) .......................... 10 2009 017 935

(51) Int. Cl.
*F01D 21/14* (2006.01)
*G01D 5/48* (2006.01)

(52) U.S. Cl.
CPC . *G01D 5/48* (2013.01); *F01D 21/14* (2013.01)

(58) Field of Classification Search
CPC ....... F01D 19/00; F01D 21/00; F01D 21/003;
F01D 21/14; F01D 21/20; F04D 27/001;
F04D 27/008; F04D 27/00; G01D 5/48;
G01M 1/00–1/365; G01M 5/00–5/0091;
G01M 9/00–9/08; G01M 13/00–13/045

USPC ..................... 415/118, 47, 61, 39; 73/112.02
See application file for complete search history.

(56) References Cited

U.S. PATENT DOCUMENTS 6,121,892 A * 9/2000 Reindl et al. ................... 340/5.8
6,744,367 B1 * 6/2004 Forster ....................... 340/572.7
(Continued)

FOREIGN PATENT DOCUMENTS

CN        101000040       7/2007
DE        197 03 616      8/1998
(Continued)

OTHER PUBLICATIONS

English translation of International Preliminary Report on Patentability dated Dec. 10, 2009 issued in a corresponding application.
(Continued)

*Primary Examiner* — Edward Look
*Assistant Examiner* — Danielle M Christensen
(74) *Attorney, Agent, or Firm* — Cozen O'Connor

(57) ABSTRACT

Turbomachine component and turbomachine outfitted therewith. The turbomachine component has a sensor unit arranged at the turbomachine component. The sensor unit has a sensor for detecting a parameter to be monitored and a transmitter for sending a measurement signal corresponding to the parameter to an evaluation unit of the turbomachine for processing. The transmitter of the sensor unit sends an encoded identification signal to the evaluation unit along with the measurement signal, this encoded identification signal contains an identification code that identifies the sensor unit. The sensor unit is configured such that the sensor unit cannot be separated from the turbomachine component without functional destruction of the sensor unit.

9 Claims, 1 Drawing Sheet

(56) References Cited

U.S. PATENT DOCUMENTS

| | | | |
|---|---|---|---|
| 2004/0012302 A1* | 1/2004 | Ikeda et al. | 310/313 D |
| 2005/0099090 A1* | 5/2005 | Hartmann et al. | 310/313 D |
| 2006/0244568 A1* | 11/2006 | Tong et al. | 340/10.41 |
| 2008/0303667 A1* | 12/2008 | Rehman | 340/572.1 |
| 2009/0033175 A1 | 2/2009 | Bruckner et al. | |
| 2009/0060716 A1* | 3/2009 | Ante et al. | 415/118 |
| 2010/0219942 A1* | 9/2010 | Lee | 340/10.51 |
| 2012/0121383 A1 | 5/2012 | Michligk | |

FOREIGN PATENT DOCUMENTS

| | | |
|---|---|---|
| DE | 10 2009 017 935 | 10/2010 |
| EP | 2 419 700 | 2/2012 |
| WO | WO 2006/110936 | 10/2006 |
| WO | WO 2010/118715 | 10/2010 |

OTHER PUBLICATIONS

English translation of Written Opinion dated Dec. 10, 2009 issued in a corresponding application.

Office Action dated Nov. 10, 2015 which issued in the corresponding Japanese Patent Application No. 2011-246681.

* cited by examiner

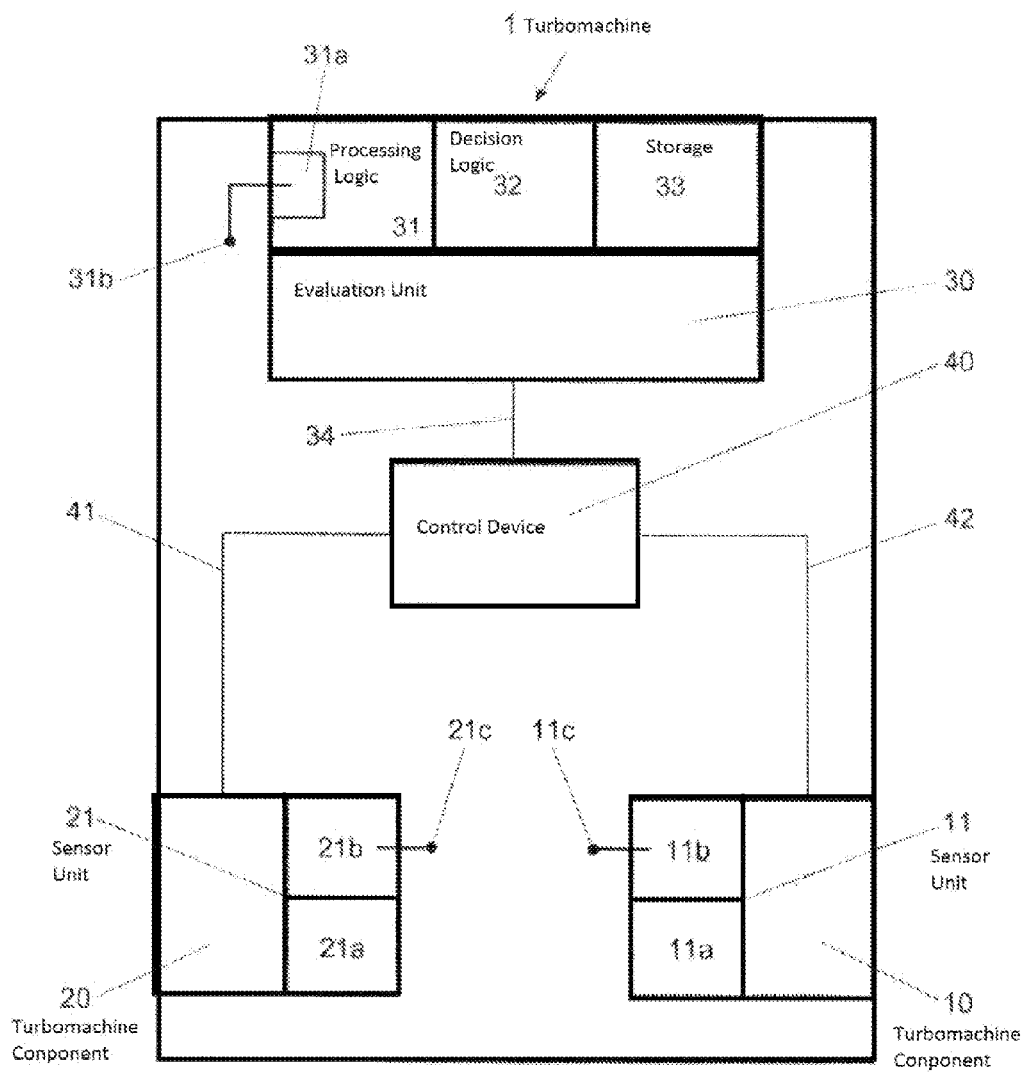

TURBOMACHINE COMPONENT AND TURBOMACHINE EQUIPPED THEREWITH

CROSS REFERENCE TO RELATED APPLICATION

This is a U.S. national stage of application No. PCT/DE2009/050071, filed on Dec. 10, 2009. Priority is claimed on German Application No.: 10 2009 017 935.6 filed Apr. 17, 2009, the content of which is incorporated here by reference.

BACKGROUND OF THE INVENTION

1. Field of the Invention

The invention is directed to a turbomachine component and to a turbomachine outfitted with a turbomachine component of this kind.

2. Description of the Prior Art

In turbomachinery such as, e.g., turbocompressors, including the components installed therein, and turbomachine trains, including the components arranged in the respective turbomachine train such as transmissions, couplings, and so on, it may be necessary because of the high loading of the respective turbomachine or turbomachine components during operation to monitor a quantity of turbomachine components during operation by measurement procedures.

Further, it is crucial in highly loaded turbomachines or turbomachine components of this kind that turbomachine components of flawless quality are installed in the turbomachine so that warranty claims can be met.

SUMMARY OF THE INVENTION

It is the object of an invention to provide a turbomachine component for use in a turbomachine in which the turbomachine component can be monitored by measurement procedures in a convenient and reliable manner on the one hand and can be unambiguously identified as a genuine part on the other hand so that counterfeit parts can be reliably distinguished from genuine parts. The invention has the further object of providing a turbomachine outfitted with a turbomachine component of this kind.

According to a first aspect of the invention, a turbomachine component is provided for use in a turbomachine, this turbomachine component having a sensor unit which is arranged at the turbomachine component; the sensor unit has a sensor for detecting a turbomachine component parameter to be monitored and a transmitter for sending a measurement signal corresponding to the parameter to an evaluation unit of the turbomachine for processing; the transmitter of the sensor unit is configured to send an encoded identification signal to the evaluation unit along with the measurement signal, this encoded identification signal containing an identification code which identifies the sensor unit; and the sensor unit is configured in such a way that the sensor unit cannot be separated from the turbomachine component without functional destruction of the sensor unit.

The turbomachine component constructed according to one embodiment of the invention can be monitored by measurement procedures in a convenient and secure manner and can also be unambiguously identified as a genuine part so that counterfeit parts can be reliably distinguished from genuine parts.

Due to the fact that the transmitter of the sensor unit is configured to send, along with the measurement signal, an encoded identification signal or identification code that identifies the sensor unit, both the measurement signal and the respective sensor unit can be unambiguously associated with a turbomachine in an evaluation unit. In this way, determined identification codes for the sensor units and, therefore, for the associated turbomachine components can be issued by the manufacturer of the turbomachine to unambiguously identify genuine parts.

Due to the fact that the sensor unit is arranged at the turbomachine component so as to be virtually nondetachable or so as to be detachable only by destroying it, sensor units from scrapped genuine parts are reliably prevented from being arranged on counterfeit parts.

According to one embodiment of the invention, the sensor unit is formed by a SAW sensor unit (SAW=surface acoustic wave), and the sensor unit has a passive transponder in which the transmitter is integrated with at least one reflector.

According to the invention, it is proposed that SAW sensors be used, e.g., as passive transponder/sensor units (hereinafter: sensor units) for different measurement tasks in turbomachines, in components thereof, or in drivetrains thereof. This makes possible, among other things, a wireless, maintenance-free transmission of measurement data.

Digital identification tags, for instance, can be produced by surface acoustic waves. To this end, a sound transducer which can receive electromagnetic signals via an antenna and convert them into surface acoustic waves can be arranged on a suitable substrate. These surface acoustic waves are then bounced off one or more reflectors arranged on the substrate and are emitted again via the sound transducer and antenna. The pulse sequence generated in this way or the identification code generated in this way can be read out by a suitable reading device or by a reading device adapted to the code, respectively.

Accordingly, SAW sensor units can unambiguously identify a wide variety of measurement sensors at turbomachine components. SAW sensor units withstand high temperatures of up to 400° C. as well as vibrations.

In other words, apart from the obvious advantages with respect to monitoring, condition monitoring and maintenance by suitable various coding of the reflectors on the sensor surface, a characteristic response signal is made possible for identification of and association of the measurement signal with a sensor unit or turbomachine component. When the sensor units are connected to the turbomachine components, according to the invention, so as to be nondetachable or so as to be detachable only destructively then, in addition to measurement, an unambiguous identification of genuine structural component parts is also possible with manufacturer-specific coding of the reflectors.

Possibilities for basic implementation of a SAW sensor unit are shown, for example, in WO2006/110936 A1.

The turbomachine component is preferably a turbocompressor component.

Particularly turbocompressors and turbines, including the components installed therein, and turbomachine trains, including the components such as transmissions, engines, etc. installed therein, are considered to be turbomachines according to the invention.

According to a second aspect of the invention, a turbomachine having a plurality of turbomachine components and an evaluation unit for monitoring the turbomachine are provided; at least one of the turbomachine components has a sensor unit which is arranged at the turbomachine component; the sensor unit has a sensor for detecting a turbomachine component parameter to be monitored and a transmitter for sending a measurement signal corresponding to the parameter to an evaluation unit of the turbomachine for processing; the transmitter of the sensor unit is configured to send an encoded identification signal to the evaluation unit along with the measurement signal, this encoded identification signal containing an identification code which identifies the sensor unit; and the evaluation unit is configured to receive and process the identification signal; and the sensor unit is configured in such a way that the sensor unit cannot be separated from the turbomachine component without functional destruction of the sensor unit.

According to the invention, the evaluation unit can be integrated in the turbomachine or can also be arranged outside the turbomachine, e.g., in a control room or control stand.

The turbomachine components of the turbomachine which are constructed according to the invention can be monitored by measurement procedures in a convenient and reliable manner and, by the identification code, can be unambiguously identified as a genuine part so that bogus parts can be reliably distinguished from genuine parts.

Due to the fact that the transmitter of the sensor unit is configured to send, along with the measurement signal, an encoded identification signal or identification code which identifies the sensor unit, both the measurement signal and the respective sensor unit can be unambiguously associated with the turbomachine in the evaluation unit. In this way, determined manufacturer-specific identification codes for the sensor units and, therefore, for the associated turbomachine components can be issued by the manufacturer of the turbomachine in order to unambiguously identify genuine parts.

Sensor units from scrapped genuine parts can be securely prevented from being arranged on counterfeit parts because the sensor unit is arranged at the respective turbomachine component so as to be virtually nondetachable or so as to be detachable only by destroying it.

According to an embodiment form of the turbomachine according to the invention, the sensor unit is formed by a SAW sensor unit, and the sensor unit has a passive transponder in which the transmitter is integrated with at least one reflector.

Therefore, apart from the obvious advantages with respect to monitoring, condition monitoring and maintenance by suitable various coding of the reflectors on the sensor surface, a characteristic response signal is made possible for identification of and association of the measurement signal with a sensor unit or turbomachine component. When the sensor units are connected to the turbomachine components, according to the invention, so as to be nondetachable or so as to be detachable only destructively then, in addition to measurement, an unambiguous identification of genuine structural component parts is also possible with manufacturer-specific coding of the reflectors.

According to another embodiment form of the turbomachine according to the invention, the evaluation unit has a storage in which a quantity of identification codes which are unique to the turbomachine, for example, can be stored, and the evaluation unit is configured to compare an identification code transmitted by the transmitter with identification codes stored in the storage.

One embodiment of the invention presents a dependable and practical solution for depositing manufacturer-specific identification codes and for detecting genuine parts and counterfeit parts as well as for detecting and correlating component-specific measurement signals.

According to yet another embodiment of the invention, the evaluation unit has a processing logic configured to associate respective identification codes stored in the storage with different respective sensors. The processing logic of the evaluation unit is preferably configured in such a way that every sensor can be associated with an individual turbomachine component.

These embodiments of the invention advantageously promote a fast and reliable detection and correlation of component-specific measurement signals.

According to yet another embodiment form of the turbomachine according to the invention, the evaluation unit has a decision logic which is configured such that identification codes stored in the storage are defined as permissible for operation of the turbomachine, and the decision logic is configured to block operation of the turbomachine when the identification code received from the transmitter or sensor unit does not match any of the identification codes stored in the storage.

Operation of the turbomachine with counterfeit parts can be prevented in a simple and certain manner with this embodiment of the invention. In other words, a completeness check with respect to the genuine turbomachine components is enabled in the evaluation unit for the measurement signals. Starting of the turbomachine can be prevented by a lock when the code for one or more genuine turbomachine components is absent. In addition to the measurement task, this allows an efficient protection against the use of bogus parts.

The turbomachine is preferably formed by a turbocompressor.

BRIEF DESCRIPTION OF THE DRAWINGS

The invention will be described in more detail in the following based on a preferred embodiment form and with reference to the accompanying drawing.

FIG. 1 is a schematic view of a turbomachine according to an embodiment form of the invention.

DETAILED DESCRIPTION OF THE PREFERRED EMBODIMENTS

FIG. 1 shows a schematic view of a turbomachine 1 which is constructed as a turbocompressor according to an embodiment form of the invention.

The turbomachine 1 has a plurality of turbomachine components 10, 20, an evaluation unit 30 for monitoring the turbomachine components 10, 20 and turbomachine 1, and a control device 40 for controlling the turbomachine components 10, 20 and turbomachine 1.

The evaluation unit 30 according to FIG. 1 is integrated in the turbomachine 1; however, this evaluation unit 30 can also be arranged outside the turbomachine 1, e.g., in a control room or a control stand according to an alternative embodiment form.

As can be seen from FIG. 1, the evaluation unit 30 is signal-linked to the control device 40 via an electric line 34 and the control device 40 is signal-linked to the turbomachine components 10, 20 (preferably wirelessly) via signal transmission paths 41, 42.

The evaluation unit 30 and the control device 40 can be constructed in the form of hardware and/or software as separate units or so as to be combined in one unit.

The two turbomachine components 10, 20 shown in the drawing represent only one example selected from a totality of turbomachine components of the turbomachine 1. According to one embodiment of the invention, a first turbomachine component 10 forms a stator stage of the turbomachine 1 and a second turbomachine component 20 forms an outlet guide vane of the turbomachine 1.

The first turbomachine component 10 has a sensor unit 11 in the form of a SAW sensor unit (SAW=sound acoustic wave) arranged at the first turbomachine component 10. The sensor unit 11 has a sensor 11a in the form of a temperature sensor for detecting a parameter to be monitored, this parameter taking the form of the temperature of the first turbomachine component 10, and a passive transponder 11b having a transmitter in the form of an arrangement comprising reflector and antenna 11c for transmitting a measurement signal corresponding to the parameter to the evaluation unit 30 of the turbomachine 1 for processing.

The second turbomachine component 20 has a sensor unit 11 in the form of a SAW sensor unit 21 arranged at the second turbomachine component 20. The sensor unit 21 has a sensor 21a in the form of a temperature sensor for detecting a parameter to be monitored, this parameter taking the form of the temperature of the second turbomachine component 20, and a passive transponder 21b having a transmitter in the form of an arrangement comprising reflector and antenna 21c for transmitting a measurement signal corresponding to the parameter to the evaluation unit 30 of the turbomachine 1 for processing.

The transmitters 11b, 21b of the sensor units 11, 21 are configured to send an encoded identification signal to the evaluation unit 30 along with the measurement signal, this encoded identification signal contains an identification code that unambiguously identifies the respective sensor unit 11, 21. The evaluation unit 30 is configured to receive and process the identification signal.

The sensor units 11, 21 are fastened, respectively, to the turbomachine components 10 and 20 respectively associated therewith in such a way that the respective sensor unit 11, 21 cannot be separated from the respective turbomachine component 10 and 20 without functional destruction of the respective sensor unit 11, 21.

This can be implemented, for example, in that the sensor units 11, 21 are arranged on the respective associated turbomachine component 10 and 20 so as to be resistant to radiation, temperature and solvents. Further, the turbomachine components 10, 20 can have, for example, an additional part which is detachably mounted thereon and which is to be removed when intentionally discarding the respective turbomachine component 10, 20 or which must even be removed in a compulsory manner when disassembling the respective turbomachine component 10, 20, and the respective sensor unit 11, 21 is arranged partially on the respective turbomachine component 10, 20 and partially on the respective additional part so as to be resistant to radiation, temperature and solvents. Of course, other implementations are also possible.

The evaluation unit 30 has a processing logic 31, a decision logic 32 and a storage 33 connected to one another for purposes of processing or are even constructed as an integral unit e.g., in the form of an integrated circuit.

A quantity of unique identification codes issued by the turbomachine manufacturer are stored in the storage 33. The processing logic 31 is configured to associate the respective identification codes stored in the storage 33 with different sensors 11a and 21a. Further, the processing logic 31 is configured in such a way that every sensor 11a, 21a or every sensor unit 11, 21 is associated with the turbomachine component 10 and 20, respectively, to which the respective sensor unit 11, 21 is fastened.

To activate the passive transponder 11b, 21b of the sensor units 11, 21 and to receive the respective output signals thereof, the processing logic 31 has a transponder 31a having an antenna 31b.

The decision logic 32 of the evaluation unit 30 is configured such that the identification codes stored in the storage 33 are defined as permissible for operation of the turbomachine 1. On this basis, the decision logic 32 is further configured to block operation of the turbomachine 1 when one of the identification codes received from the sensor units 11, 21 does not match any of the identification codes stored in the storage 33. To this end, the decision logic 32 sends a status signal (operation allowed or operation prohibited) to the control device 40 via line 34, and the control device 40 permits or blocks the operation of the turbomachine components 10, 20 or of the turbomachine 1 based on this status signal.

When it is desired to start the turbomachine 1, a completeness check is carried out in the evaluation unit 30 with respect to the presence of exclusively genuine parts as turbomachine components 10, 20. If counterfeit parts are installed as turbomachine components 10, 20 and the code for one or more turbomachine components 10, 20 constructed as genuine parts is absent, the turbomachine 1 is prevented from starting by the lock described above. In addition to the measurement task, this allows an efficient protection against the use of counterfeit parts.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A turbomachine component for use in a turbomachine, comprising:
    an evaluation unit of the turbomachine;
    a sensor unit arranged at the turbomachine component, comprising:
        a sensor configured to detect a parameter of the turbomachine component to be monitored;
        a transmitter for sending a measurement signal corresponding to the detected parameter to the evaluation unit of the turbomachine for processing,
    wherein the transmitter of the sensor unit is configured to send an encoded identification signal to the evaluation unit along with the measurement signal, the encoded identification signal having a unique identification code that identifies the sensor unit, and
    wherein the sensor unit is configured such that the sensor unit cannot be separated from the turbomachine component without functional destruction of at least the sensor unit; and
    an evaluation unit having a memory in which at least one manufacturer identification code unique to the turbomachine is stored, the evaluation unit configured to compare the unique identification code transmitted by the transmitter with the at least one manufacturer identification code stored in the memory to determine if the turbomachine component is authentic; and
    wherein the evaluation unit includes decision logic configured such that the at least one manufacturer code stored in the memory is defined as permissible for operation of the turbomachine, and wherein the decision logic is configured to block operation of the turbomachine when the unique identification code received from the transmitter does not match any of the identification codes stored in the memory.

2. The turbomachine component according to claim 1, wherein the sensor unit is formed by a surface acoustic wave (SAW) sensor unit, the sensor unit having a passive transponder in which the transmitter is integrated with at least one reflector.

3. The turbomachine component according to claim 1, wherein the turbomachine component is one of a turbocompressor component, a gas turbine component, a steam turbine component, and an expander component.

4. A turbomachine comprising:
   an evaluation unit for monitoring the turbomachine;
   a plurality of turbomachine components, at least one of the plural turbomachine components comprises:
      a sensor unit arranged at the turbomachine component, wherein the sensor unit has a sensor for detecting a parameter of the turbomachine component to be monitored and a transmitter for sending a measurement signal corresponding to the parameter to the evaluation unit for processing,
   wherein the transmitter of the sensor unit is configured to send an encoded identification signal to the evaluation unit along with the measurement signal, the encoded identification signal containing a unique identification code that identifies the sensor unit,
   wherein the evaluation unit is configured to receive and process the identification signal, and
   wherein the sensor unit is configured such that the sensor unit cannot be separated from the turbomachine component without functional destruction of the sensor unit,
   wherein the evaluation unit has a memory in which at least one manufacturer identification code unique to the turbomachine is stored, the evaluation unit configured to compare the unique identification code transmitted by the transmitter with the at least one manufacturer identification code stored in the memory to determine if the turbomachine component is authentic; and
   wherein the evaluation unit includes decision logic configured such that the at least one manufacturer code stored in the memory is defined as permissible for operation of the turbomachine, and wherein the decision logic is configured to block operation of the turbomachine when the unique identification code received from the transmitter does not match the at least one manufacturer code stored in the memory.

5. The turbomachine according to claim 4, wherein the sensor unit comprises:
   a SAW sensor unit; and
   a passive transponder in which the transmitter is integrated with at least one reflector.

6. The turbomachine according to claim 4, wherein a processing logic of the evaluation unit is configured such that the sensor is associated with an individual turbomachine component.

7. The turbomachine according to claim 4, wherein the evaluation unit comprises processing logic configured to associate respective identification codes stored in the memory with different respective sensors.

8. The turbomachine according to claim 7, wherein the processing logic of the evaluation unit is configured such that every sensor is associated with an individual turbomachine component.

9. The turbomachine according to claim 4, wherein the turbomachine is one of a turbocompressor, a gas turbine, a steam turbine, and an expander.

\* \* \* \* \*